United States Patent
Morita

(10) Patent No.: US 6,820,832 B2
(45) Date of Patent: Nov. 23, 2004

(54) MAGNETIC TAPE CARTRIDGE

(75) Inventor: Kiyoo Morita, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 10/228,199

(22) Filed: Aug. 27, 2002

(65) Prior Publication Data

US 2003/0001040 A1 Jan. 2, 2003

Related U.S. Application Data

(62) Division of application No. 09/887,333, filed on Jun. 25, 2001, now abandoned.

(30) Foreign Application Priority Data

Jun. 26, 2000 (JP) .......................................... 2000-191098

(51) Int. Cl.[7] ............................................. G11B 23/107
(52) U.S. Cl. ..................................... 242/348.2; 360/132
(58) Field of Search ............................ 242/348, 348.2, 242/344, 912; 360/132

(56) References Cited

U.S. PATENT DOCUMENTS

| | | | |
|---|---|---|---|
| 5,218,342 A | | 6/1993 | McCrackin |
| 5,784,227 A | * | 7/1998 | Kitamura et al. ........... 360/132 |
| 6,125,012 A | | 9/2000 | Miyazaki et al. |
| 6,236,539 B1 | | 5/2001 | Morita et al. |
| 6,299,088 B1 | * | 10/2001 | Rambosek .............. 360/132 X |
| 6,331,922 B2 | | 12/2001 | Morita et al. |
| 6,349,892 B2 | | 2/2002 | Morita et al. |
| 6,452,745 B1 | * | 9/2002 | Shiga et al. ................. 360/132 |
| 6,481,658 B1 | * | 11/2002 | Shiga et al. ................. 360/132 |
| 2001/0043436 A1 | * | 11/2001 | Onmori et al. ............. 360/132 |
| 2003/0002214 A1 | * | 1/2003 | Kitamura et al. ........... 360/132 |
| 2003/0007287 A1 | * | 1/2003 | Morita et al. ............... 360/132 |

FOREIGN PATENT DOCUMENTS

| | | |
|---|---|---|
| EP | 0 924 701 A | 6/1999 |
| EP | 0 924 702 A | 6/1999 |
| EP | 0 926 675 A | 6/1999 |
| EP | 0 942 427 A | 9/1999 |
| EP | 0 944 083 A | 9/1999 |
| JP | 11-306722 A | 11/1999 |
| WO | WO 99 67786 A | 12/1999 |
| WO | WO 00 04547 A | 1/2000 |
| WO | WO 00 31739 A | 6/2000 |

OTHER PUBLICATIONS

Patent Abstracts of Japan, vol. 2000, No. 02, Feb. 29, 2000 & JP 11 306722 A (Fuji Photo Film Co Ltd), Nov. 5, 1999 *abstract*.

* cited by examiner

*Primary Examiner*—Emmanuel Marcelo
(74) *Attorney, Agent, or Firm*—Sughrue Mion, PLLC

(57) ABSTRACT

A magnetic tape cartridge includes a cartridge case, which is formed by fastening upper and lower cases integrally and has a tape leader opening in side walls of the upper and lower cases. Within the cartridge case, a single reel with magnetic tape wound thereon is rotatably housed. A slender leader pin firmly attached to the leading end of the magnetic tape is detachably held near the tape leader opening and between the upper and lower cases. In the magnetic tape cartridge, a small-diameter pin for fastening the upper and lower cases is press-fitted near a holding portion of the cartridge case which holds the leader pin.

19 Claims, 20 Drawing Sheets

F I G. 4A
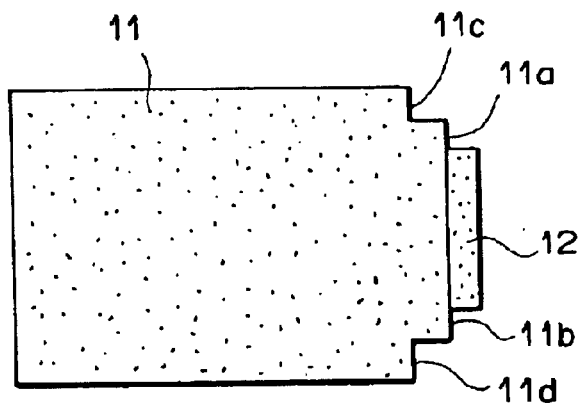
F I G. 4B
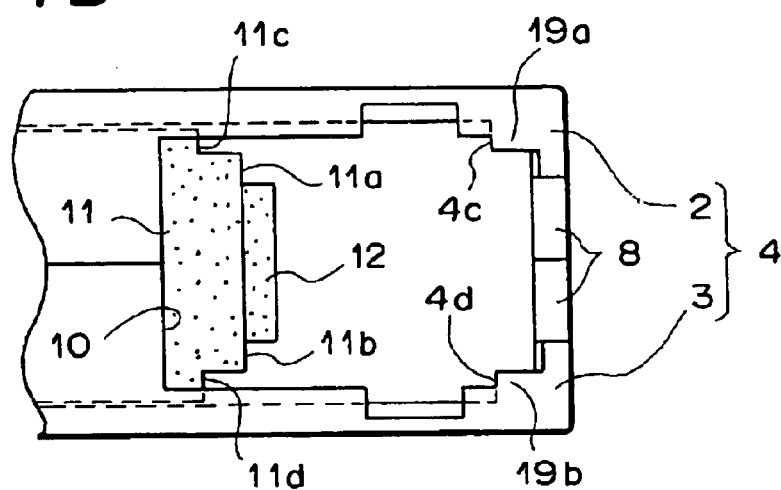
F I G. 4C
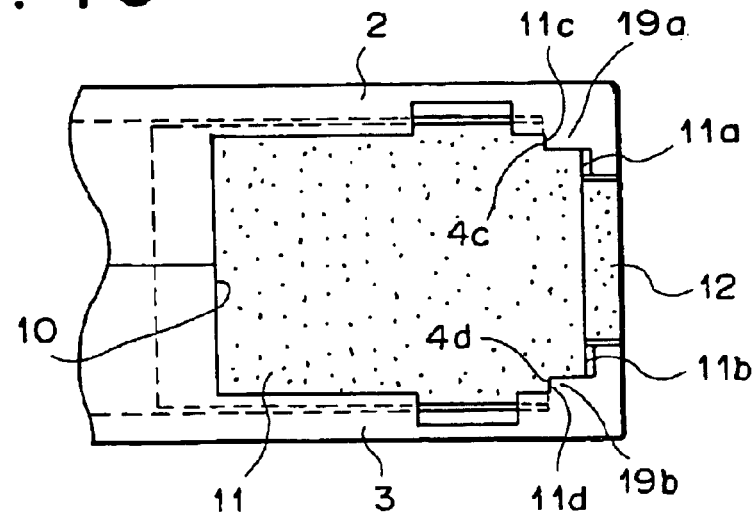

FIG. 8A
FIG. 8B
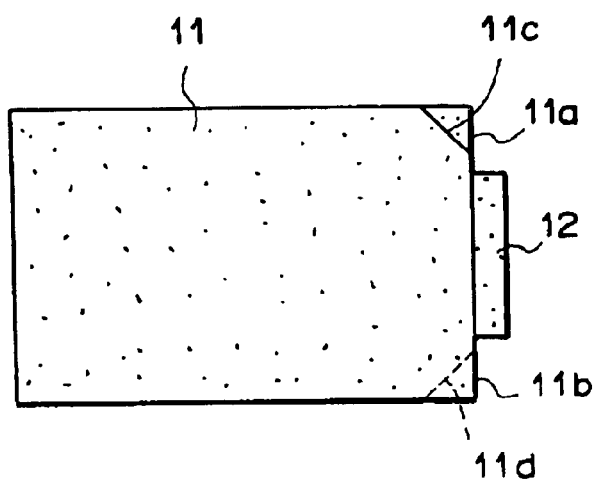
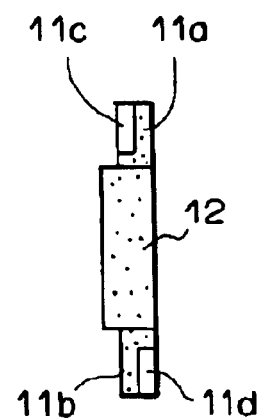

MAGNETIC TAPE CARTRIDGE

This is a divisional of application Ser. No. 09/887,333 filed Jun. 25, 2001 now abandoned; the disclosure of which is incorporated herein by reference.

BACKGROUND OF THE INVENTION

1. Field of the Invention

The present invention relates to a magnetic tape cartridge where a single reel with magnetic tape wound thereon is rotatably housed within a cartridge case.

2. Description of the Related Art

In magnetic tape cartridges, which are being used as storage media that are employed in external storage units for computers, etc., there is known a type where a single reel with magnetic tape wound thereon is rotatably housed within a cartridge case. This magnetic tape is employed to archive data for computers, etc. Since important information has been stored, the magnetic cartridge is constructed so that problems, such as tape jamming, etc., do not occur and that the magnetic tape is not pulled out of the cartridge case unexpectedly.

Also, the magnetic tape has a tape leader pin firmly attached to the leading end thereof. When this magnetic tape cartridge is loaded into a recording-reproducing unit, a pin catching member on the side of the recording-reproducing unit engages the tape leader pin and pulls out the magnetic tape from the cartridge case. On the other hand, when the magnetic tape cartridge is unloaded from the recording-reproducing unit, the magnetic tape is rewound on the reel and the tape leader pin is returned into the cartridge case by the pin catching member.

The cartridge case is formed by fastening upper and lower cases of synthetic resin together with a plurality of small screws. The leader pin, as disclosed in Japanese Unexamined Patent Publication No. 11 (1999)-306722, etc., is detachably held in a vertical direction between the upper and lower cases, near a tape leader opening provided in the cartridge case. Also, near the tape leader opening, there is provided a slide door, urged toward a closing position by a spring, for opening and closing the tape leader opening.

FIGS. 1A and 1B illustrate the vicinity of the tape leader opening in the conventional magnetic tape cartridge described in the aforementioned publication. The open state and closed state of the slide door are shown in FIGS. 1A and 1B, respectively. The essential part of the slide door is shown in FIG. 1C.

In a side wall of the cartridge case 4 with an upper case 2 and a lower case 3 integrally fastened, a tape leader opening 10 is formed between the upper and lower cases 2, 3 and near the corner. A slide door 11 for opening and closing the tape leader opening 10 is provided so that it is slidable in a direction parallel to a direction where the magnetic tape is inserted into a recording-reproducing unit (i.e., the right direction in FIGS. 1A and 1B and therefore the right direction is taken to be the front direction of the cartridge case 4).

A leader pin 5 is detachably held within the cartridge case 4, facing the tape leader opening 10. The leader pin 5 is constructed, for example, of a metal main body and a synthetic-resin clamp member 5e, as shown in FIG. 1. The main body consists of a core shaft portion 5a to which the leading end of the magnetic tape 6 is clamped; thin flange portions 5b, 5b formed at the upper and lower ends of the core shaft portion 5a; and thick flange portions 5d, 5d formed outside the flange portions 5b, 5b through thin shaft portions 5c, 5c. The clamp member 5e has a C-cross section and is fitted elastically onto the outer periphery of the core shaft portion 5a. The thin shaft portions 5c, 5c are clamped by the pin holding member of the recording-reproducing unit when the magnetic tape cartridge is loaded into or unloaded from the recording-reproducing unit.

The slide door 11 is urged toward a closing position by a spring member compressed in the interior of the cartridge case and is held in the closing position shown in FIG. 1B. The slide door 11 is equipped with an engagement portion 12 that protrudes forward and outward from the front end (in the closing direction) of the door 11. If the magnetic tape cartridge is loaded into the recording-reproducing unit, the engagement portion 12 engages a member provided in the unit and the slide door 11 is opened. In the front wall of the cartridge case 4, a recess 8 is formed to house the engagement portion 12, with the front surface of the engagement portion 12 exposed through the front wall surface of the cartridge case 4.

In the magnetic tape cartridge constructed as described above, the front surfaces 11a, 11b, on the top side and bottom side of the engagement portion 12, of the slide door 11 abut the back surfaces 4a, 4b of the front wall of the cartridge case, whereby the slide door 11 is held in the closing position.

However, the front wall of the cartridge case 4 with the back surfaces 4a, 4b which are abutted by the front surfaces 11a, 11b of the slide door 11 is susceptible to shock, for example, when the magnetic tape cartridge falls. When subjected to such a shock, the front wall will be deformed and the positioning precision in the sliding direction of the slide door 11 at the closing position will be reduced.

With long-term use, the synthetic-resin rail portion and/or slide door 11 will wear and vertical play will develop in the slide door 11. Because of this, the positioning precision in the vertical direction of the slide door 11 at the closing position will be reduced.

Thus, if the positioning precision at the closing position of the slide door 11 is reduced, it will have detrimental effects on the opening operation for the slide door 11 based on the positional relationship between the engagement portion 12 of the slide door 11 and the engaging member of the recording-reproducing unit.

The upper and lower cases 2, 3 constituting the cartridge case 4 is usually fastened together by four small screws. However, in the case where the upper and lower cases 2, 3 are fastened together by small screws, the stem portion of the small screw requires a thickness of some magnitude or greater to have a screw groove therein. Furthermore, for these small screws, one of the upper and lower cases 2, 3 requires bosses having a transmission bore, while the other requires bosses having a screw bore. Therefore, space for these bosses has to be assured.

Near the holding portion for the leader pin 5, however, there is no space to provide bosses which are used for fastening small screws, because a tape running path is assured in order to avoid interference with the pin holding portion of the recording-reproducing unit. Because of this, the force fastening the upper and lower cases 2, 3 is weaker near the leader-pin holding portions than other parts.

Therefore, in the case where a strong shock is exerted on the cartridge case 4 because of a fall, etc., or in the case where a force of opening the upper and lower cases 2, 3 is exerted near the tape leader opening 10, there is a problem that the upper and lower cases 2, 3 in that portion will be moved away from each other and that the light, slender leader pin 5 will fall off the cartridge case 4.

To prevent the falling-off of the leader pin 5, the abutting surfaces of the upper and lower cases 2, 3 of the cartridge case 4 can be welded over the entire circumference. However, welding the abutting surfaces of the upper and lower cases 2, 3 is undesirable with regard to disassembly, because there is a need to disassemble the cartridge case 4 and take out the magnetic tape with important data along with the reel and then put them into a new cartridge case, in the event of an unforeseen accident, or after long-term use.

Furthermore, in the magnetic tape cartridge mentioned above, a memory element is provided to specify the contents of various data recorded on magnetic tape, tape type, etc., without reading them out. This memory element is equipped with a semiconductor chip and is constructed so that data recorded on magnetic tape is recorded on the memory element by a non-contact method such as electromagnetic induction, etc., and that contents recorded on the memory element are likewise read out by the non-contact method.

Such a memory element is provided in a part, within the cartridge case 4, which does not disturb rotation of the reel. In that case, it is necessary to mount the memory element at a position, desirable for a recording-reproducing unit into which the magnetic tape cartridge 4 is loaded, so that in the recording-reproducing unit, data can be written to or read from the memory element without difficulty. Furthermore, it is desirable that the mounting of the memory element in the cartridge case 4 be easily and efficiently performed concurrently with assembly of the cartridge case 4.

In view of the aforementioned circumstances, it is a first object of the present invention to provide a magnetic tape cartridge that is capable of preventing a reduction in the horizontal positioning precision, at a closing position, of the slide door even when subjected to a falling shock, etc.

A second object of the invention is to provide a magnetic tape cartridge that is capable of enhancing the vertical positioning precision, at the closing position, of the slide door.

A third object of the invention is to provide a magnetic tape cartridge which is capable of enhancing the fastening strength of the upper and lower cases near the leader-pin holding portion, while taking disassembly of the cartridge case into consideration.

A fourth object of the invention is to provide a magnetic tape cartridge which is capable of easily mounting a memory element in the cartridge case, at a position desirable for a magnetic recording-reproducing unit into which the magnetic tape cartridge is loaded, and in a predetermined posture.

SUMMARY OF THE INVENTION

To achieve the first object of the present invention mentioned above, there is provided a first magnetic tape cartridge comprising:

a cartridge case with a tape leader opening in side walls;

a single reel having magnetic tape wound thereon, and rotatably housed within the cartridge case; and a slide door, which is urged toward a closing position by a spring and held in the closing position by abutting the cartridge case, for opening and closing the tape leader opening;

wherein the slide door has an abutting surface that abuts the cartridge case, the abutting surface being provided at a position spaced rearward from a front end of the slide door.

The cartridge case is provided with an abutting surface conforming to the abutting surface of the slide door. In this manner, the entry of dust is prevented.

According to the first magnetic tape cartridge of the present invention, the abutting surface of the slide door is provided at a position spaced rearward from the front end of the slide door. With this arrangement, the abutting surface of the cartridge case which abuts the abutting surface of the slide door can be provided at a position spaced from the corner portion of the cartridge case. Therefore, the first magnetic tape cartridge of the present invention is not easily affected by a falling shock, etc., and is capable of preventing a reduction in the positioning precision, at the closing position, of the slide door. In addition, since the abutting surface of the cartridge case is provided at a position spaced from the corner portion of the cartridge case, the corner portion can be reinforced by connecting the abutting surface and the corner portion through ribs, etc.

To achieve the second object of the present invention mentioned above, there is provided a second magnetic tape cartridge comprising:

a cartridge case with a tape leader opening in side walls;

a single reel having magnetic tape wound thereon, and rotatably housed within the cartridge case; and a slide door, which is urged toward a closing position by a spring and held in the closing position by abutting the cartridge case, for opening and closing the tape leader opening;

wherein the cartridge further comprises means for positioning the slide door in the closing position and means for regulating a vertical position of the slide door.

In the second magnetic tape cartridge of the present invention, it is preferable that the means for positioning the slide door in the closing position also have the function of regulating the vertical position of the slide door. Positioning means for regulating both the horizontal direction and the vertical direction, at the closing position, of the slide door can be achieved by the abutting surfaces of the slide door and the cartridge case, inclined with respect to the direction where the slide door slides. The inclined surfaces may be tapered surfaces or curved surfaces.

According to the second magnetic tape cartridge of the present invention, the means for positioning the slide door in the closing position also has the function of regulating the vertical position of the slide door. Thus, the second magnetic tape cartridge of the present invention is capable of enhancing the vertical positioning precision, at the closing position, of the slide door. In addition, the positioning means for regulating both the horizontal direction and the vertical direction, at the closing position, of the slide door is obtained by the abutting surfaces inclined with respect to the direction where the slide door slides. Thus, the positioning means is achieved with an extremely simple construction.

To achieve the third object of the present invention mentioned above, there is provided a third magnetic tape cartridge comprising:

a cartridge case, formed by fastening upper and lower cases integrally, and having a tape leader opening in side walls of the upper and lower cases;

a single reel having magnetic tape wound thereon, and rotatably housed within the cartridge case; and a slender leader pin firmly attached to a leading end of the magnetic tape and detachably held near the tape leader opening and between the upper and lower cases;

wherein a small-diameter pin for fastening the upper and lower cases is press-fitted near a holding portion of the cartridge case which holds the leader pin.

In the third magnetic tape cartridge of the present invention, the small-diameter pin may have a stem portion (of about 0.5 mm in outside diameter), a large-diameter head portion at one end of the stem portion, and a protrusion at the other end of the stem portion, the protrusion being provided to prevent the small-diameter pin from coming out.

In the case where the upper and lower cases are fastened together by small screws, as described above, the stem portion of the small screw requires a thickness of some magnitude or greater to have a screw groove therein. Furthermore, one of the upper and lower cases requires bosses having a transmission bore, while the other requires bosses having a screw bore. For these reasons, it is difficult to provide the bosses near the leader-pin holding portion. According to the third magnetic tape cartridge of the present invention, the upper and lower cases can be firmly fastened together by the small-diameter press-fit pin that requires no bosses. Therefore, the third magnetic tape cartridge of the present invention is capable of preventing the light and slender leader pin, held between the upper and lower cases, from falling off the cartridge case. In addition, in the case where there is a need to disassemble the cartridge case, the lower end portion of the small-diameter press-fit pin can be removed from the lower case, by removing the small screws and then applying force so that the upper and lower cases are opened, at the corner portions of the cartridge case opposite from the leader-pin holding portion. Thus, the cartridge case can be easily disassembled.

To achieve the fourth object of the present invention mentioned above, there is provided a fourth magnetic tape cartridge comprising:

a cartridge case, formed by fastening upper and lower cases integrally, and having a tape leader opening in side walls of the upper and lower cases;

a single reel having magnetic tape wound thereon, and rotatably housed within the cartridge case; and a flat non-contact type memory element, where data is stored, housed within the cartridge case;

wherein the cartridge case is provided with an element mounting portion having an insertion slit open to a case surface, and after assembly of the cartridge case, the memory element is inserted through the insertion slit and held in the element mounting portion.

In the fourth magnetic tape cartridge of the present invention, the insertion slit may be formed in a side surface of the cartridge case, and the memory element may be inserted and held in the element mounting portion so that it forms an angle of approximately 45 degrees with the bottom surface of the cartridge case. Also, the insertion slit may be formed in the top surface or bottom surface of the cartridge case, and the memory element may be inserted and held in the element mounting portion so that it forms an angle of approximately 90 degrees with the bottom surface of the cartridge case. In addition, the memory element may have elastic portions at its side portions, and the memory element may be held in the element mounting portion by elastic deformation of the elastic portions produced when the memory element is inserted through the insertion slit. Furthermore, the memory element may be press-fitted in the element mounting portion through the insertion slit without providing the elastic portions.

The memory element is constructed such that data can be written to or read from one surface thereof. This surface is disposed in a predetermined posture at a position desirable for a magnetic recording-reproducing unit which uses this magnetic tape cartridge.

According to the fourth magnetic tape cartridge of the present invention, the flat non-contact type memory element is inserted through the insertion slit and held in the element mounting portion, after assembly of the cartridge case. Therefore, the mounting of the memory element in the cartridge case, at a position desirable for a magnetic recording-reproducing unit into which the magnetic tape cartridge is loaded, and in a predetermined posture, can be easily and efficiently performed along with assembly of the cartridge case.

BRIEF DESCRIPTION OF THE DRAWINGS

The present invention will be described in further detail with reference to the accompanying drawings wherein:

FIG. 4A is a side view showing a first construction of the slide door to which the present invention is applied;

FIG. 4B is a side view showing the vicinity of an opening formed in the magnetic tape cartridge, a slide door being opened;

FIG. 4C is a side view showing the vicinity of the opening formed in the magnetic tape cartridge, the slide door being closed;

FIG. 8A is a side view showing a fifth construction of the slide door to which the present invention is applied;

FIG. 8B is a front view of the slide door shown in FIG. 8A;

DESCRIPTION OF THE PREFERRED EMBODIMENTS

Figure 1A:
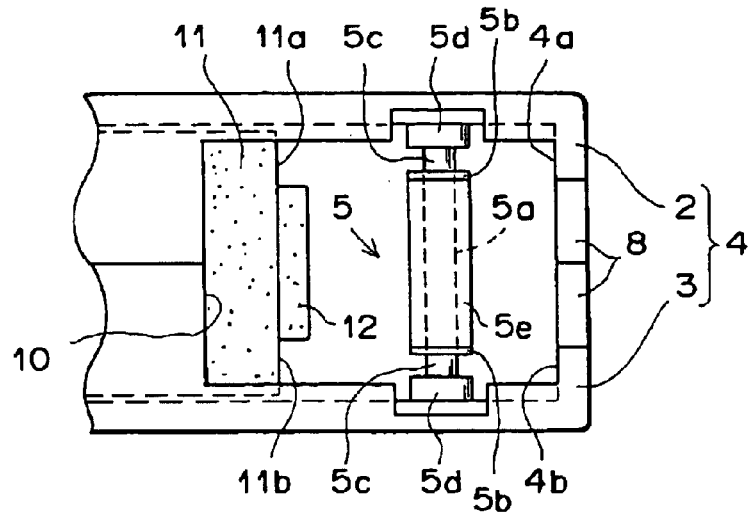
FIG. 1A is a side view showing the vicinity of an opening formed in a conventional magnetic tape cartridge, a slide door being opened.
Figure 1B:
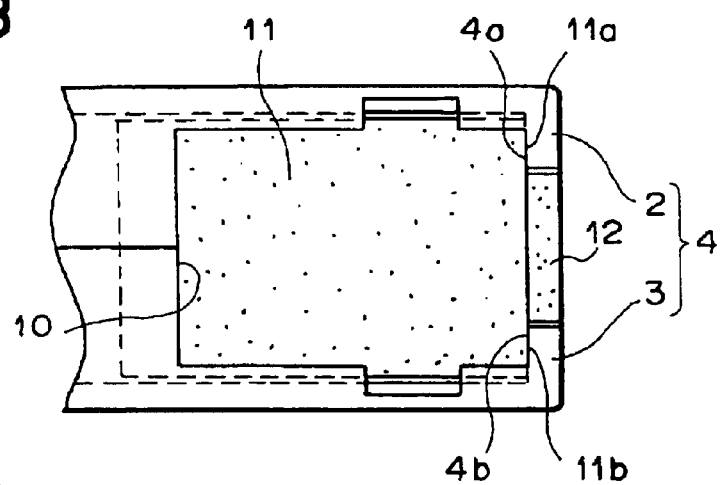
FIG. 1B is a side view showing the closed state of the slide door.
Figure 1C:
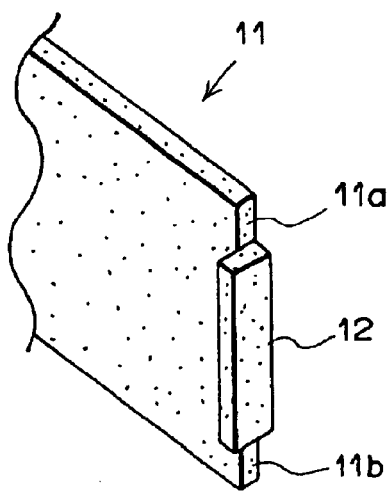
FIG. 1C is a part-perspective view showing the slide door.

An embodiment of the present invention will hereinafter be described in detail with reference to the drawings. Note that the fore-and-aft direction in this embodiment corresponds to a direction (i.e., a direction diagonal to the upper right of FIG. 2) in which a magnetic tape cartridge is loaded into a magnetic recording-reproducing unit. Also, in FIGS. 4B and 7B, a leader pin is omitted. Furthermore, in FIGS. 3 to 9, the same reference numerals are applied to the same parts as FIGS. 1A to 1C to avoid redundancy.

Figure 2:
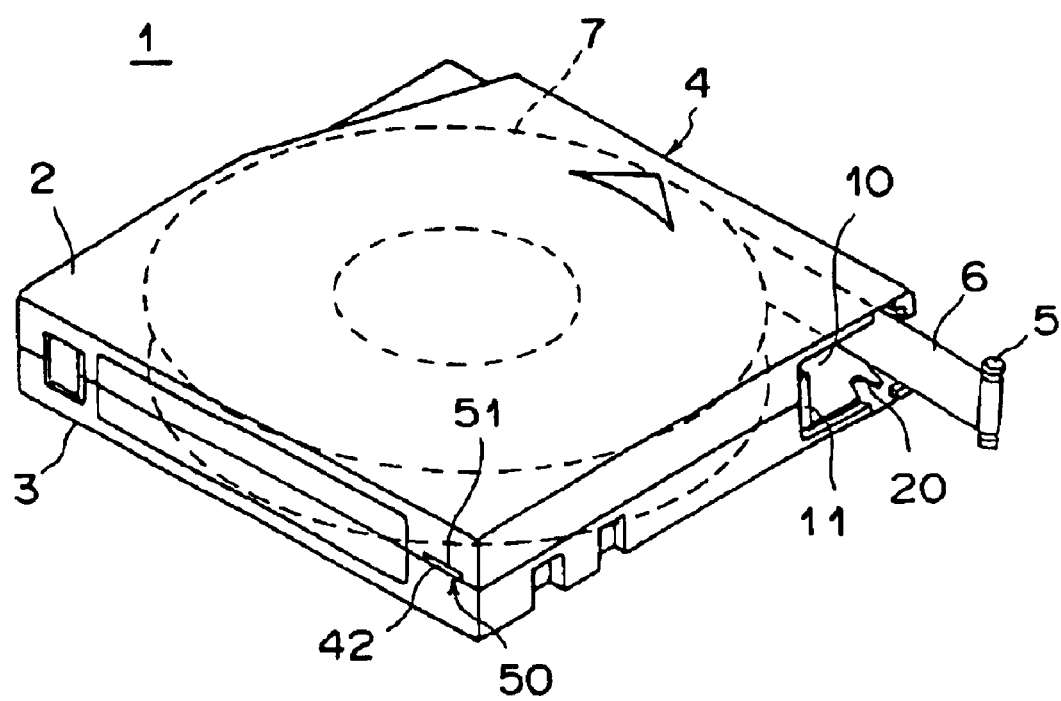
FIG. 2 is a perspective view showing a magnetic tape cartridge constructed according to an embodiment of the present invention, magnetic tape being pulled out of the tape cartridge.
Figure 3:
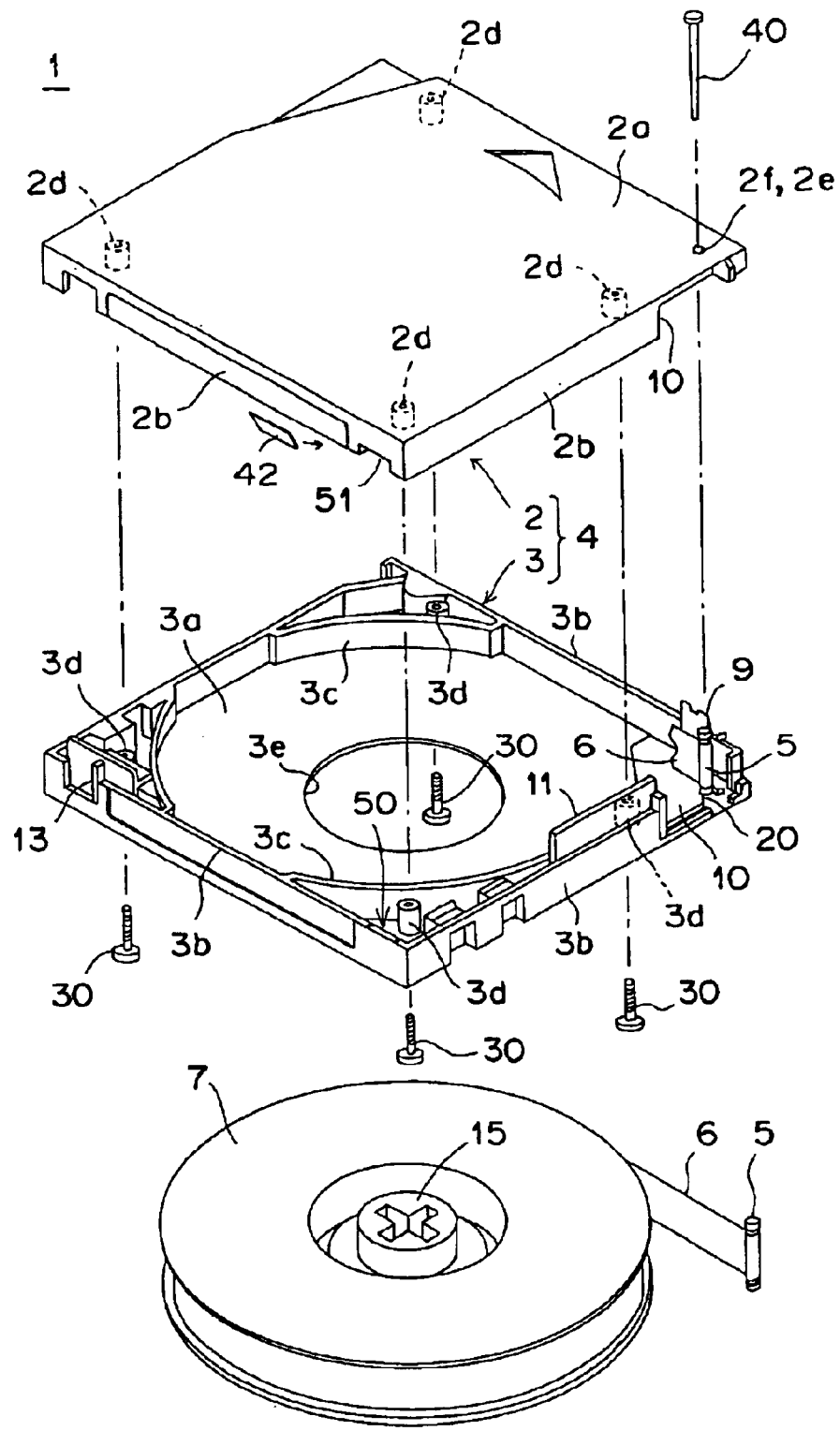
FIG. 3 is an exploded perspective view showing the magnetic tape cartridge of FIG. 2.

In FIGS. 2 and 3, the magnetic tape cartridge 1 has a cartridge case 4, formed by fastening an upper case 2 and a lower case 3 together with four small screws 30. A leader pin 5 is firmly attached to the leading end of magnetic tape 6, and a single tape reel 7 with the magnetic tape 6 wound thereon is rotatably housed within the cartridge case 4. The upper and lower cases 2 and 3 are approximately rectangular in shape, and upper and lower side walls 2a and 3a are provided on the circumferences of the top and bottom walls 2b and 3b. The upper and lower cases 2 and 3 further have arcuate inside walls 3c (not shown for the upper case 2) extending along the outer periphery of the tape reel 7. The four boss portions 3d of the lower case 3, each disposed between the side wall 3b and the inside wall 3c, are aligned with the four boss portions 2d of the upper case 2, and the upper and lower cases 2 and 3 are fastened together by the small screws 30 inserted through the bottom surface of the lower case 3.

A center hole 3e is formed in the central portion of the lower case 3 so that the tape reel 7 can be rotated by the driving shaft of a drive unit (not shown). A write inhibit member 13 is disposed near the rear end of the cartridge case 4 so that it is slidable. The tape reel 7 is provided at the central portion thereof with a rotation regulating mechanism 15 for restricting rotation of the tape reel 7 not being used.

Although not shown, a reel plate is mounted on the bottom surface of the tape reel 7 so that a magnet type rotation drive means is attracted and held on the central portion of the tape reel 7. The radially outer portion (not shown) of the bottom wall of the tape reel 7 is provided with a reel gear (not shown) which meshes with the driving gear of the rotation drive means. Note that if the reel gear and the driving gear mesh with each other, the rotation regulating means 15 is unlocked so that the tape reel 7 is free to rotate.

At one of the rear corners of the cartridge case 4, a non-contact memory element 42 (cartridge memory) for recording data recorded on the magnetic tape 6 is inserted through an insertion slit 51 formed in the cartridge case 4 and is mounted in an element mounting portion 50.

The side walls 2b, 3b of the upper and lower cases 2, 3 are provided with an opening 10 for pulling out the magnetic tape 6. The opening 10 is opened and closed by a slide door 11 urged in a closing direction by a spring (not shown). Near the opening 10, there is formed a grooved door rail 41 (see FIG. 11) along which the slide door 11 slides.

In the magnetic tape cartridge 1, the leader pin 5 is locked and held in a housing recess 20 formed near the opening 10, with the magnetic tape 6 completely wound on the reel 7 during non-use of the cartridge 1. This housing recess 20 is continuous to an insertion-guide portion 21 (see FIGS. 10 and 11) formed into a lead-in structure. The insertion-guide portion 21 is constructed so that the end portion of the leader pin 5 can be guided to the pin housing recess 20 on the depth side.

As shown in FIG. 4A, the slide door 11 is equipped with stepped portions at positions spaced in an opening direction (left direction in the figure) from front surfaces 11a, 11b, and the stepped portions have abutting surfaces 11c, 11d which abut the cartridge case 4.

On the other hand, the cartridge case 4 has abutting surfaces 4c, 4d, which abut the abutting surfaces 11c, 11d of the slide door 11 and hold the slide door 11 in the closing position, as shown in FIGS. 4B and 4C. The abutting surfaces 4c, 4d are formed at positions spaced from the corners of the cartridge case 4 in the direction where the slide door 11 is opened. The front wall of the cartridge case 4 and the abutting surfaces 4c, 4d are connected through ribs 19a, 19b.

Thus, since the abutting surfaces 4c, 4d are spaced from the front wall of the cartridge case 4, they are not easily affected by shock such as a fall. As a result, a reduction in the positioning precision of the slide door at the closing position can be prevented. In addition, because the front wall of the cartridge case 4 and the abutting surfaces 4c, 4d are connected through ribs 19a, 19b, the corner portions of the cartridge case 4 are reinforced and therefore there is also an advantage that resistance to shock is enhanced.

Figure 5:
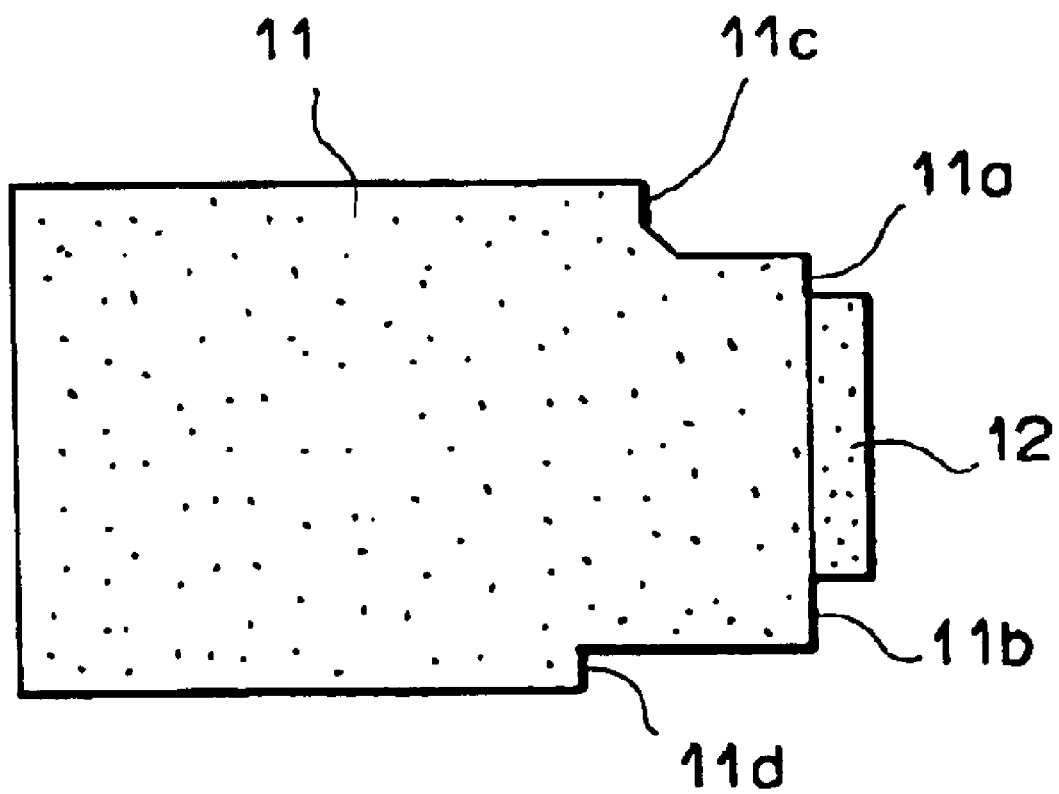
FIG. 5 is a side view showing a second construction of the slide door to which the present invention is applied.

Note that while the abutting surfaces 11c, 11d of the slide door 11 shown in FIG. 4A are symmetrical up and down, they may be asymmetrical as shown in FIG. 5. In that case, the abutting surfaces 4c, 4d of the cartridge case 4 are asymmetrically provided so that they correspond to the abutting surfaces 11c, 11d of the slide door 11.

Figure 6A:
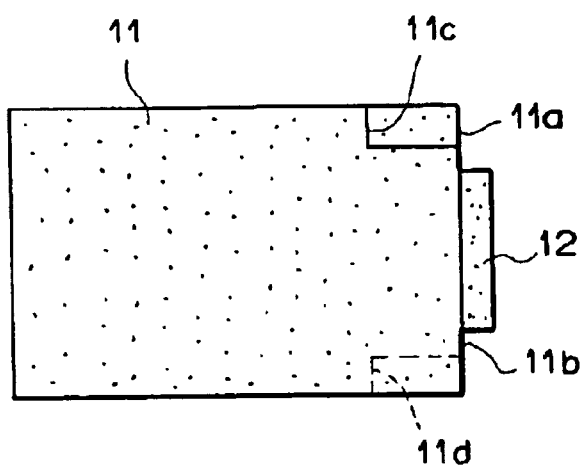
FIG. 6A is a side view showing a third construction of the slide door to which the present invention is applied.
Figure 6B:
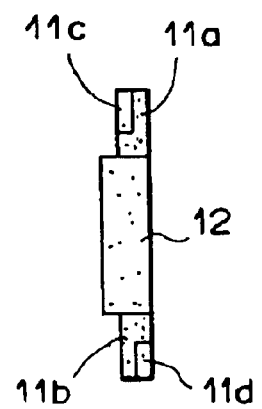
FIG. 6B is a front view of the slide door shown in FIG. 6A.

FIGS. 6A and 6B illustrate a third construction of the slide door 11 to which the present invention is applied. Abutting surfaces 11c, 11d are formed in recesses formed in the exterior surface and interior surface of the slide door 11, respectively. Note that similar abutting surfaces 11c, 11d may be formed in the same surface of the slide door 11.

Figure 7A:
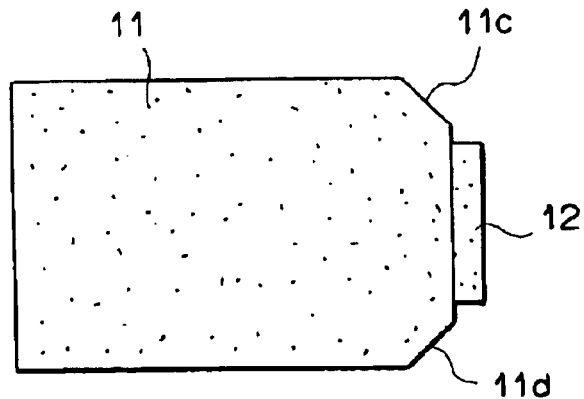
FIG. 7A is a side view showing a fourth construction of the slide door to which the present invention is applied.

In FIGS. 7A to 9, the closing position in the sliding direction (horizontal direction) of the slide door 11 is regulated by the abutting surfaces 11c, 11d of the slide door 11. The vertical position of the slide door 11 at the closing position is also regulated by the abutting surfaces 11c, 11d. That is, as shown in FIGS. 7A to 7C, the front upper and lower ends in the closing direction of the slide door 11 are formed into inclined surfaces 11c, 11d that abut the cartridge case 4.

Figure 7B:
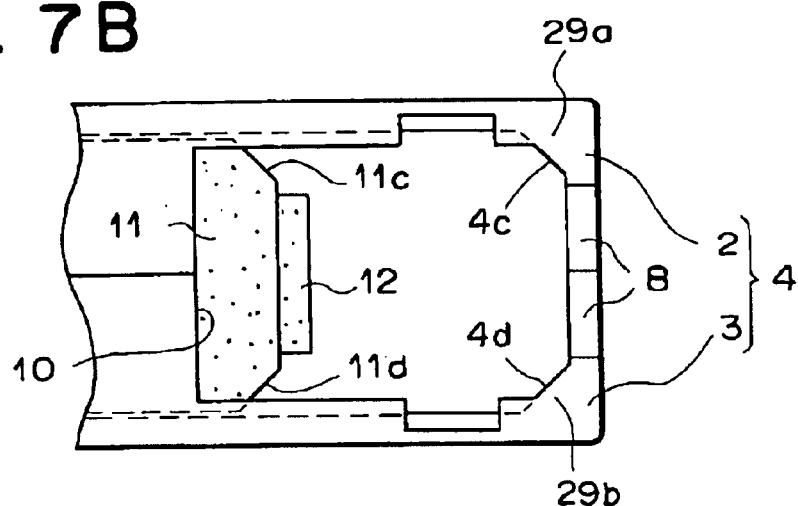
FIG. 7B is a side view showing the vicinity of the opening formed in the magnetic tape cartridge, the slide door being opened.
Figure 7C:
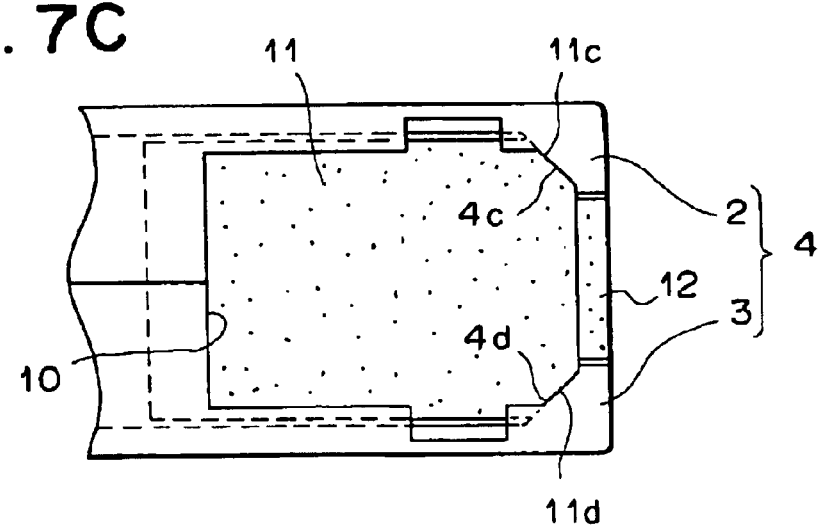
FIG. 7C is a side view showing the vicinity of the opening formed in the magnetic tape cartridge, the slide door being closed.

On the other hand, the cartridge case 4 has inclined, abutting surfaces 4c, 4d which surface-contact the inclined, abutting surfaces 11c, 11d of the slide door 11 and hold the slide door 11 at the closing position, as shown in FIGS. 7B and 7C. Therefore, if the inclined surfaces 11c, 11d are brought into surface-contact with the inclined surfaces 4c, 4d, the closing position in the sliding direction (horizontal direction of the slide door 11 is regulated and the vertical position of the slide door 11 at the closing position is also regulated.

If the inclined, abutting surfaces 4c, 4d are formed in the cartridge case 4, ribs 29a, 29b are formed in the upper and lower corner portions on the right side of the tape leader opening 10, as shown in FIG. 7B. As a result, the corner portions of the cartridge case 4 are reinforced and there is also an advantage that resistance to shock such as a fall is enhanced.

FIGS. 8A and 8B illustrate a fifth construction of the slide door to which the present invention is applied. Abutting surfaces 11c, 11d, which consist of inclined surfaces, are formed in recesses formed in the exterior surface and interior surface of the slide door. The abutting surfaces 11c, 11d may be formed in the same surface of the slide door 11.

In FIGS. 7A to 8, the upper and lower abutting surfaces 11c, 11d of the slide door 11 which consist of inclined surfaces are formed symmetrically. However, for example, only the upper abutting surface 11c may be formed into an inclined surface to push the slide door 11 downward, while the lower abutting surface 11d may be formed into the same vertical front surface 11b as FIG. 1C to regulate the horizontal closing position.

Figure 9:
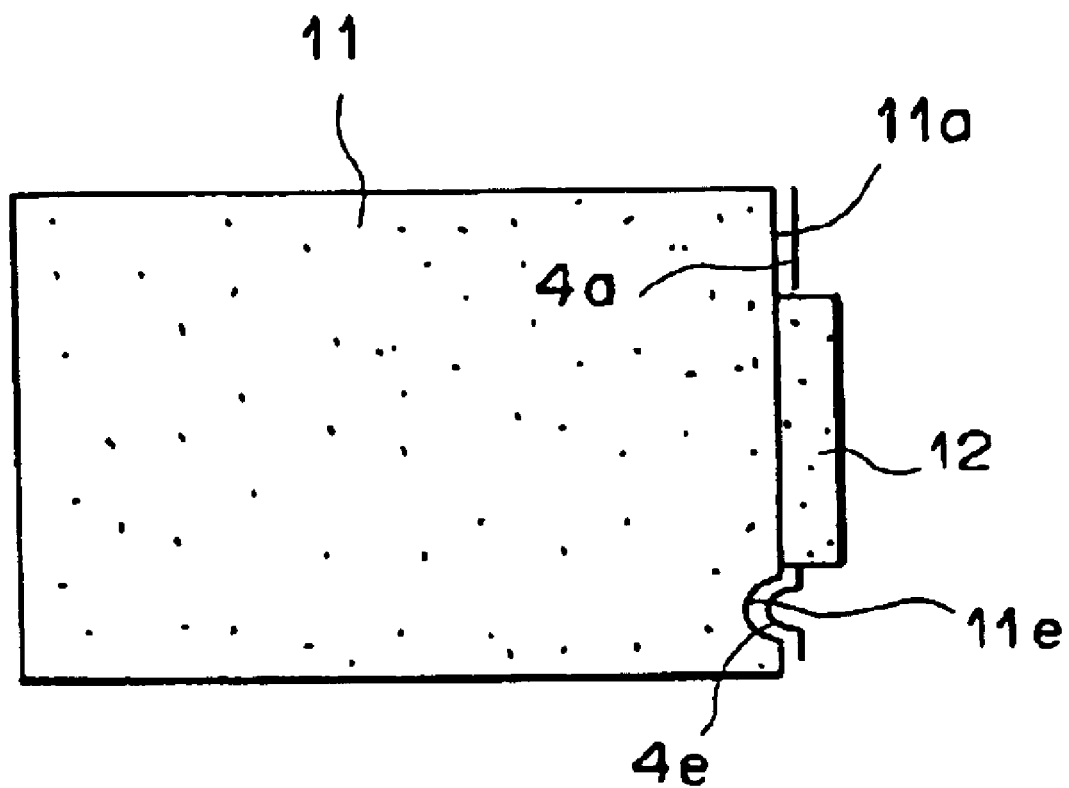
FIG. 9 is a side view showing a sixth construction of the slide door to which the present invention is applied.

Furthermore, as shown in FIG. 9, the upper abutting surface of the slide door 11 may be formed into a vertical front surface 11a so that it can abut the vertical abutting surface 4a of the cartridge case 4 to regulate the horizontal closing position. The lower abutting surface of the slide door 11 may be formed into a semicircular recess 11e so that it can engage a semicircular protrusion 4e of the cartridge case 4 to regulate the vertical position of the slide door 11.

Figure 10:
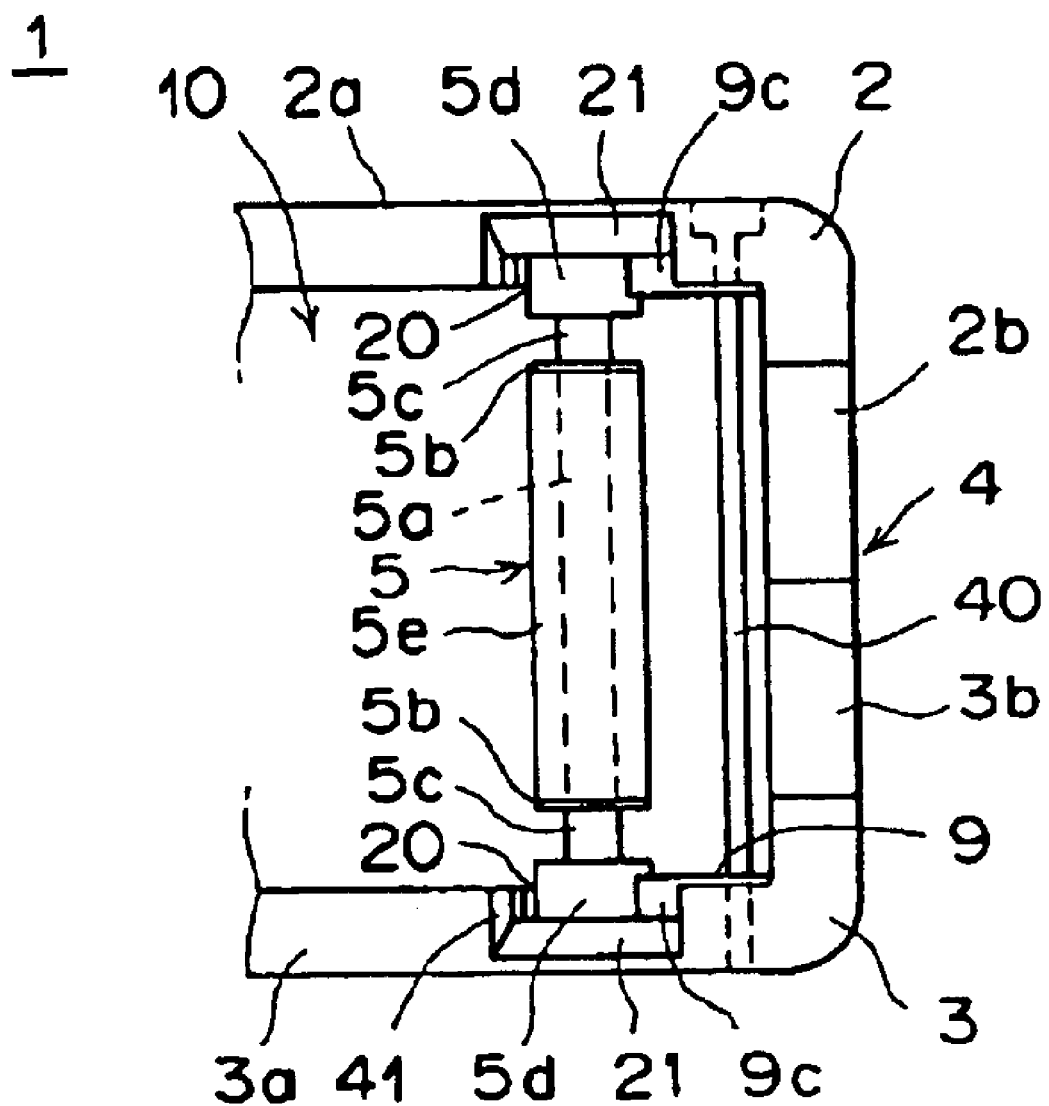
FIG. 10 is a side view showing the vicinity of the opening, the slide door being opened.
Figure 12A:
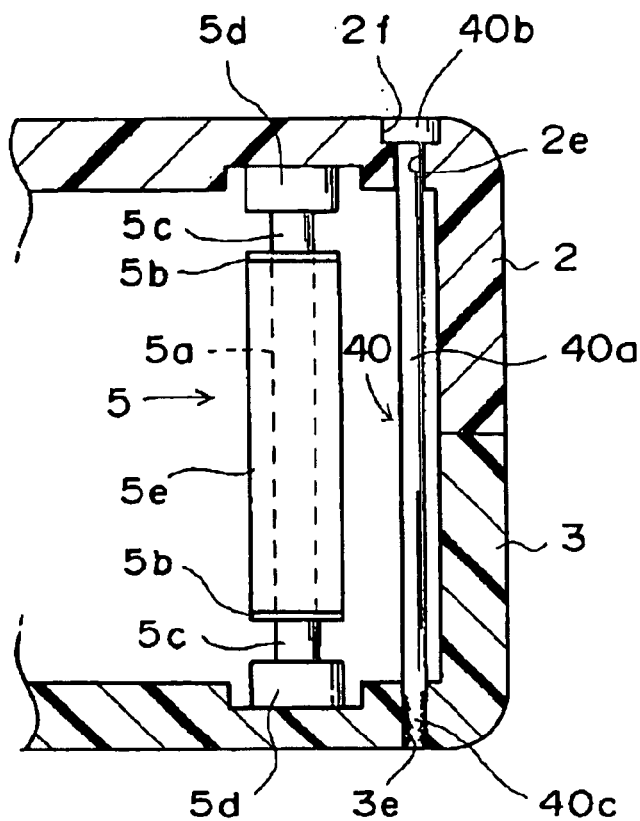
FIG. 12A is a sectional view showing the vicinity of a press-fit pin driven into the cartridge case.
Figure 13:
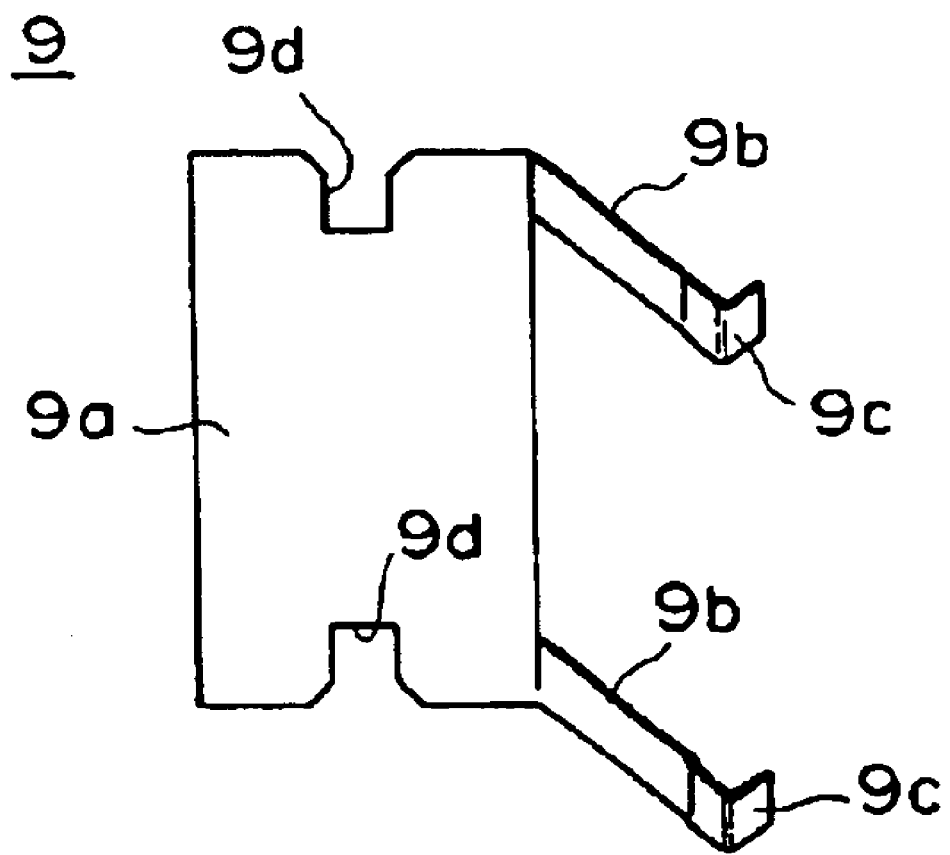
FIG. 13 is a perspective view of a stopper spring.

In order to introduce the magnetic tape 6 into a tape running path by the drive mechanism of a recording-producing unit into which the magnetic tape cartridge 1 is loaded, the leader pin 5 is constructed so that it is held and pulled out of the opening 10 by a pin hold member provided in the drive mechanism. The leader pin 5 is constructed, for example, of a metal main body and a synthetic-resin clamp member 5e, as illustrated in FIGS. 10 and 12A. The main body consists of a core shaft portion 5a to which the leading end of the magnetic tape 6 is clamped; thin flange portions 5b, 5b formed at the upper and lower ends of the core shaft portion 5a; and thick flange portions 5d, 5d formed outside the flange portions 5b, 5b through thin shaft portions 5c, 5c. The clamp member 5e is fitted elastically onto the outer periphery of the core shaft portion 5a. This clamp member 5e has a C-cross section and constitutes a tape clamp portion between the flange portions 5b, 5b along with the core shaft portion 5a. In addition, the upper and lower cases 2, 3 are provided with a stopper member 9, which consists of a plate spring such as that shown in FIG. 13, to detachably hold the leader pin 5 in the housing recess 20.

Figure 11:
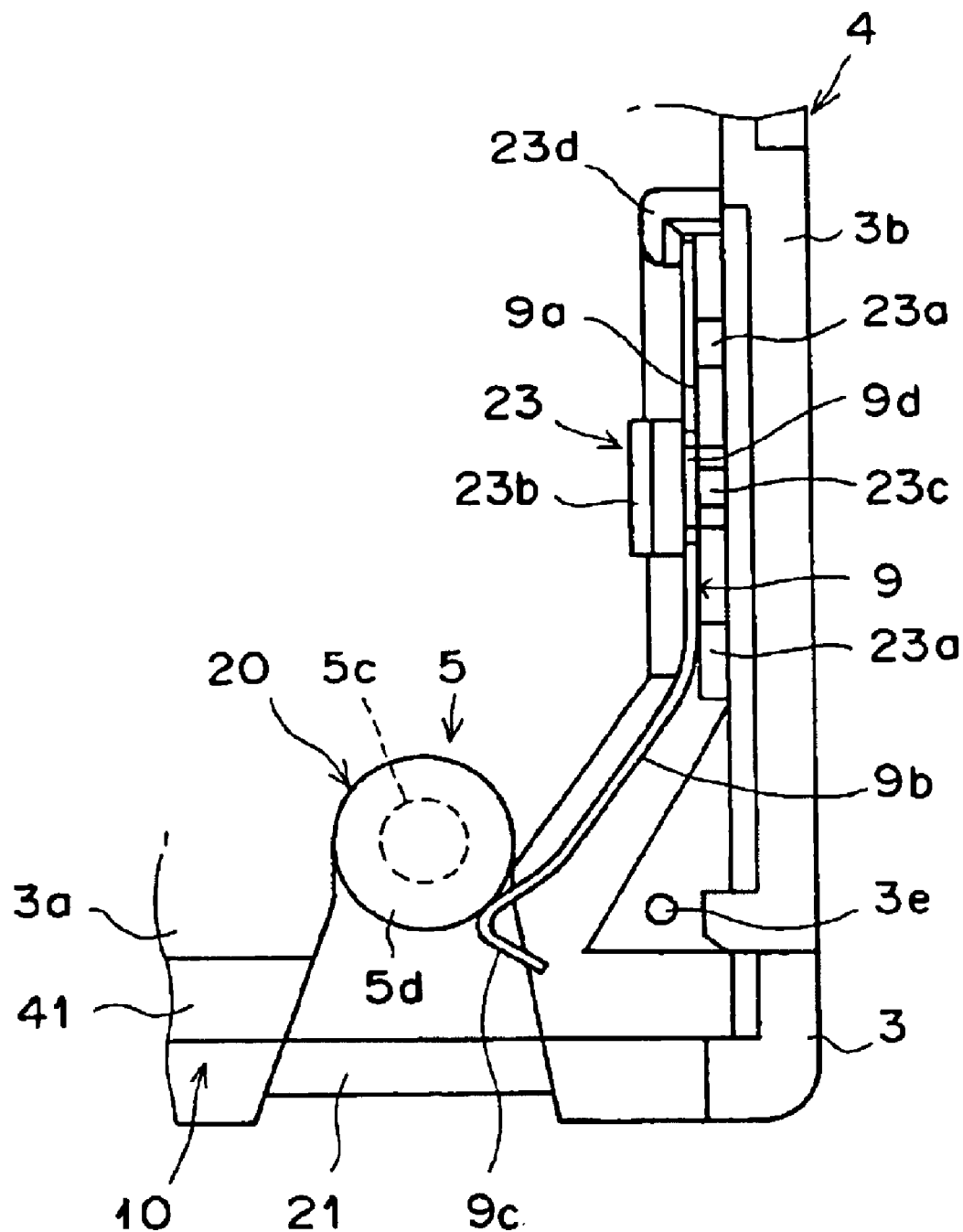
FIG. 11 is a plan view of the vicinity of the opening shown in FIG. 10, an upper case being removed.

The stopper member 9 is integral up and down and has a mounting portion 9a in the form of a generally rectangular plate. With the upper case 2 and the lower case 3 stacked with each other, the mounting portion 9a is engaged and held by a spring installing portion 23 provided near the case side walls (front walls) 2b, 3b, as shown in FIG. 11 (although not shown, the upper case 2 is symmetrical in shape with the lower case 3). The stopper member 9 also has a pair of elastic arm portions 9b, 9b extending obliquely from the upper and lower end portions of the mounting portion 9a toward the leader pin 5. The elastic arm portions 9b, 9b have pin holding portions 9c, 9c at their outer ends, respectively. The pin holding portions 9c, 9c elastically abut the outer peripheries of the upper and lower flange portions 5d, 5d of the leader pin 5. Each pin holding portion 9c is bent so that it projects toward the leader pin 5. If the leader pin 5 is inserted through the opening 10, the leader pin 5 is brought into contact with the outer inclined surface of the bent portion of the pin holding portion 9c, and the elastic arm portion 9b is elastically deformed. As a result, the leader pin 5 is pressed and held within the housing recesses 20 by the inner inclined surface of the bent portion of the pin holding portion 9c. In addition, the top and bottom edges of the mounting portion 9a are provided with engaging recesses 9d.

The spring installing portion 23 of the upper and lower cases 2, 3 that holds the stopper member 9 is equipped with ribs 23a and 23a, formed on the interior surfaces of the side walls (front walls) 2b, 3b of the upper and lower cases 2 and 3, and a protrusion 23b erected in the bottom surface, between the ribs 23a and 23a. If the mounting portion 9a of the stopper member 9 is inserted between the ribs 23a and the protrusion 23b, a protruding portion 23c on the bottom surface is fitted into the engaging recess 9d and holds the stopper member 9. Furthermore, the spring installing portion 23 is provided with a tilt regulating portion 23d, which is used for holding the proximal portion of the mounting portion 9a of the stopper member 9 remote from the elastic arm portion 9b in an upright state.

Figure 12B:
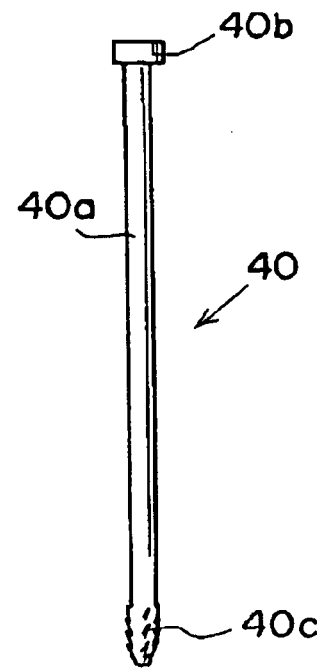
FIG. 12B is a front view of the press-fit pin shown in FIG. 12A.

In this embodiment of the present invention, in addition to fastening the upper and lower cases 2, 3 together by the four small screws 30, portions near the leader-pin holding portions are fastened together by a thin press-fit pin 40 of about 0.5 mm in diameter, such as that shown in FIG. 12B.

The pin 40 has a stem portion 40a of about 0.5 mm in diameter and a large-diameter head portion 40b. The lower end or tip end of the pin 40 is formed into a protrusion 40c, which serves as a member for preventing it from coming out. In addition, the top wall 2a of the upper case 2a, as shown in FIG. 12A, has a small bore 2e into which the stem portion 40a of the pin 40 is inserted, and a counter bore 2f on the small bore 2e to receive the head portion 40b of the pin 40. The bottom wall of the lower case 3 has a small bore 3e into which the lower end portion of the stem portion 40a of the pin 40 is press-fitted. If the pin 40 is driven into the small bore 2e of the upper case 2, the protrusion 40c of the stem portion 40a of the pin 40 is press-fitted into the small bore 3e of the lower case 3. As a result, the upper and lower cases 2, 3 are firmly fastened at portions near the leader-pin holding portions by the pin 40.

It is difficult to fasten the upper and lower cases 2, 3 with the small screws 30, because there is no space for providing boss portions at portions near the leader-pin holding portions. However, in this embodiment, it is possible to fasten the upper and lower cases 2, 3 together in the vicinities of the leader-pin holding portions by employing the small-diameter press-fit pin 40 which requires no boss portions. Therefore, for example, in the case where the cartridge case 4 is subjected to a strong shock due to a fall, etc., the light, long leader pin 5 being held between the upper and lower cases 2, 3 can be prevented from falling off the cartridge case 4.

In addition, in the case where there is a need to disassemble the cartridge case 4, the lower end portion of the small-diameter press-fit pin 40 can be removed from the lower case 3, by removing the small screws 30 and then applying force so that the upper and lower cases 2, 3 are opened, at the corner portions of the cartridge case 4 opposite from the leader-pin holding portions. Thus, the cartridge case 4 can be easily disassembled.

Figure 14:
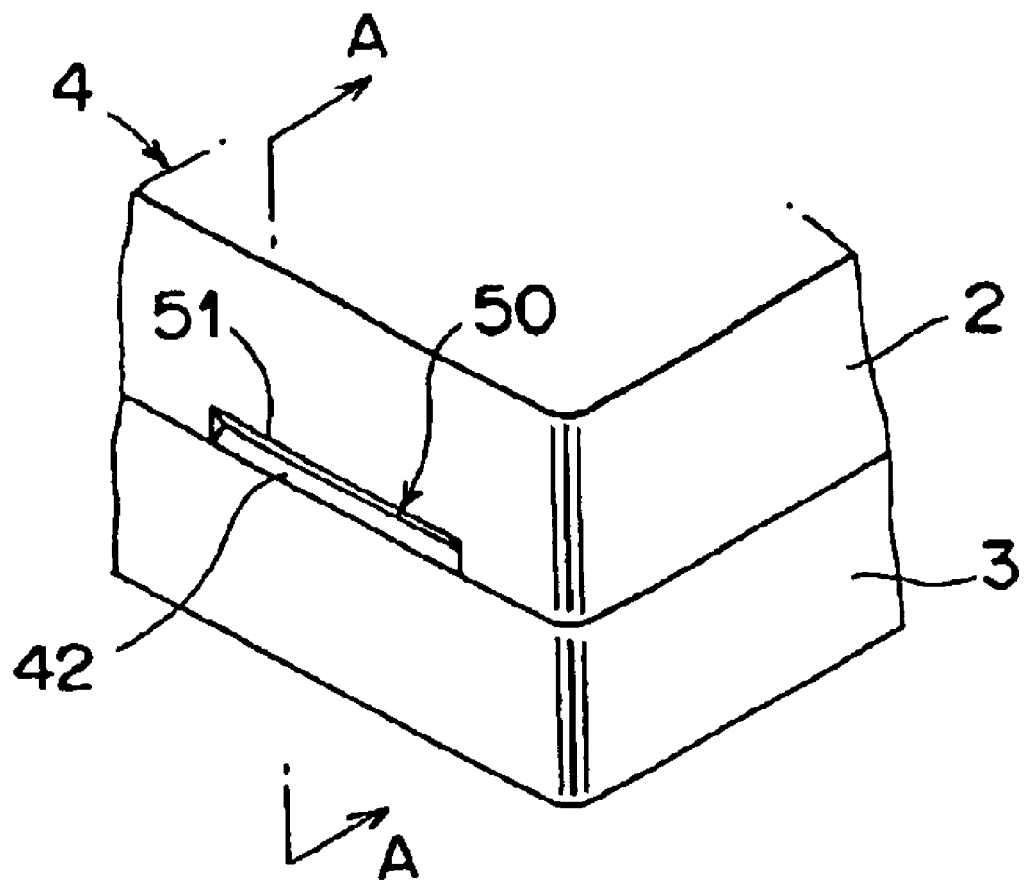
FIG. 14 is an enlarged perspective view of the memory-element mounting portion of FIG. 2.
Figure 15:
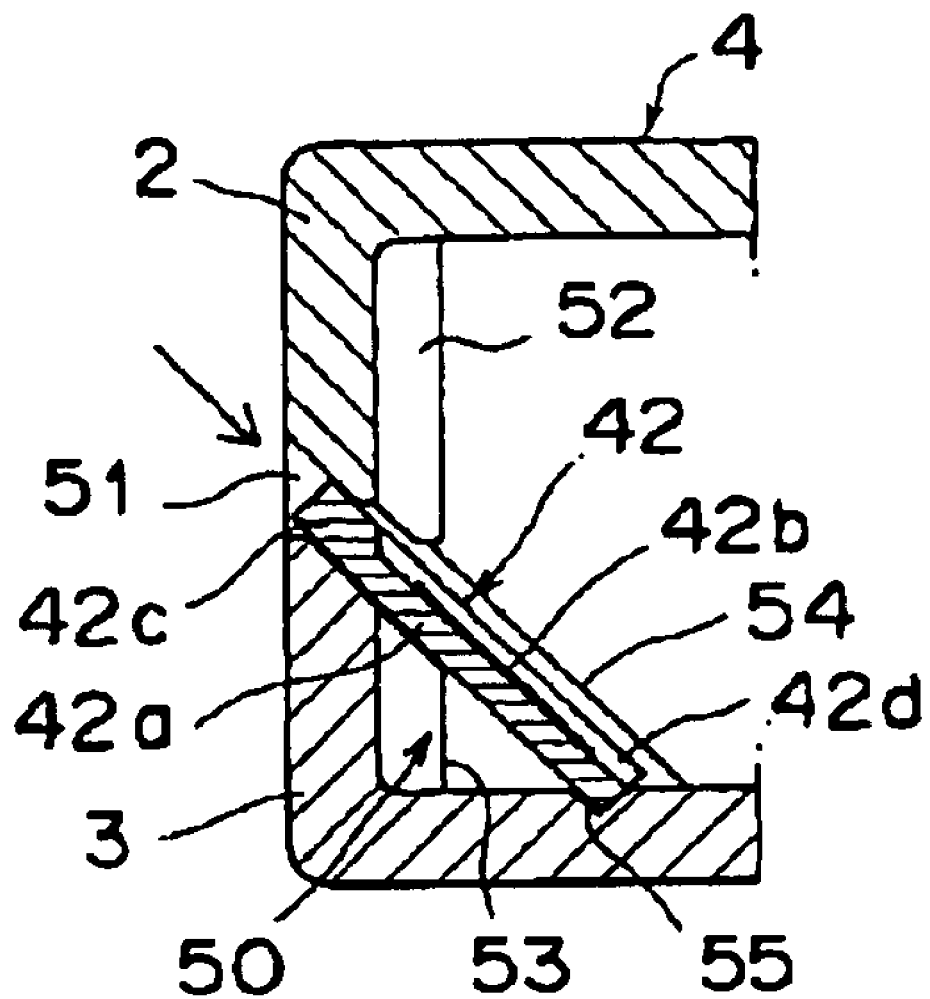
FIG. 15 is a sectional view taken substantially along line A—A of FIG. 14.
Figure 16:
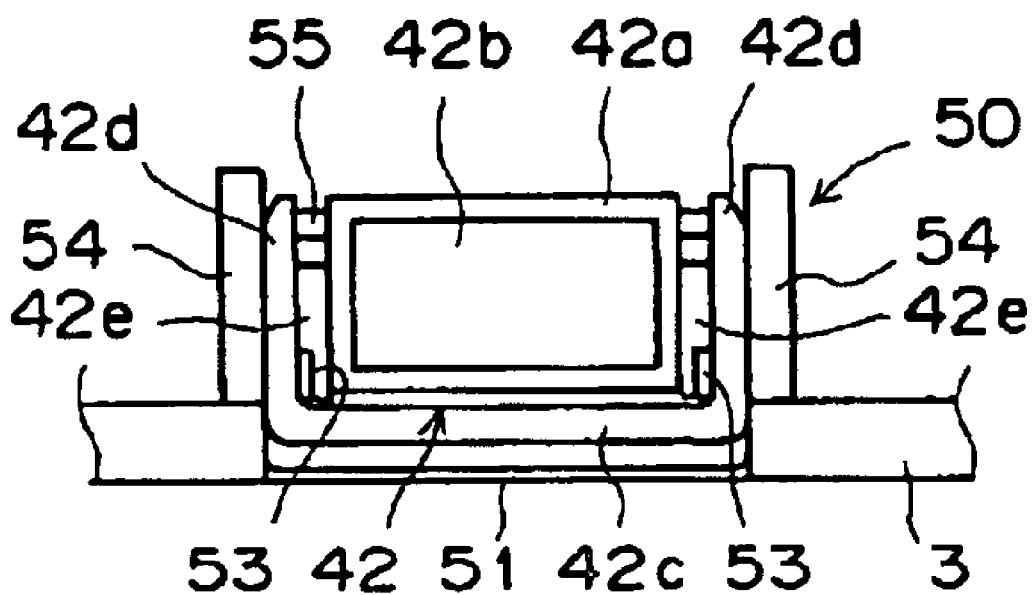
FIG. 16 is a plan view of the memory-element mounting portion shown in FIG. 14, the upper case being removed.

As illustrated in FIGS. 14 to 16, in the memory element 42 mounted in one rear corner of the cartridge case 4, the top surface is mounted in the element mounting portion 50 at an angle of 45 degrees to the bottom surface of the cartridge case 4 so that data can be easily written to or read from the memory element 42 by read means provided in a magnetic recording-reproducing unit.

The memory element 42 includes a rectangular board 42a and an element portion 42b, which consists of a semiconductor chip, mounted on the board 42a. The element portion 42b is smaller in size than the board 42a. The memory element 42 is constructed such that data can be written to or read from one side (top surface) with non-contact by an electromagnetic induction method, etc. The rear frame portion 42c of the memory element 42 is formed to a thickness equivalent to the width of an insertion slit 51 and is thicker than the thickness of the board 42a and the element portion 42b (see FIG. 15). Furthermore, the opposite side portions of the frame portion 42c have elastic portions 42d, 42d which are given elasticity by grooves 42e, 42e formed on both sides of the board 42a from the front end. Each of the elastic portions 42d, 42d is formed so that the outside dimension of the tip end is greater than that of the proximal portion, and the tip end of the elastic portion 42d is elastically deformable inside. The elastic portion 42d is formed to the same thickness as the frame portion 42c and is cut obliquely at the tip end so that insertion of the memory element 42 can be easily guided.

The element mounting portion 50 provided in the cartridge case 4 has the insertion slit 51 opening to the corner portion of the rear surface of the case 4, and the memory element 42 is inserted through the insertion slit 51. The insertion slit 51 extends laterally along the abutting surface between the upper case 2 and the lower case 3 and is open diagonally and downward. The top surface and bottom surface of the insertion slit 51 are formed into inclined surfaces of approximately 45 degrees. The interior surfaces of the side walls of the upper and lower cases 2, 3 near the opposite ends of the insertion slit 51 are provided with upper and lower ribs 52, 53 extending from the inner ends of the insertion slit 51. The bottom surface of the upper rib 52 and the top surface of the lower rib 53 are also formed into inclined surfaces continuous to the top and bottom surfaces of the insertion slit 51. The inclined surfaces of the upper and lower ribs 52, 53 are engageable with the top and bottom surfaces of the elastic portions 42d, 42d on the opposite sides of the memory element 42, respectively.

Furthermore, supporting walls 54, 54 are formed outside the ribs 52, 52 so that the exterior surfaces of the elastic portions 42d, 42d of the memory element 42 can abut the supporting walls 54, 54. The inside dimension between the supporting walls 54, 54 is formed to correspond to the width of the memory element 42. In the bottom wall of the lower case 3 near the element mounting portion 50, a stopper groove 55 is formed so that it can hold the front corner portions of the memory element 42.

After the upper case 2 and the lower case 3 are fastened together by the four small screws 30, and the cartridge case 4 is assembled, the memory element 42 is inserted oblique to the element mounting portion 50 through the insertion slit 51, while the elastic portions 42d, 42d are being slid along the interior surfaces of the supporting walls 54, 54 and being elastically deformed. When this occurs, the memory element 42 is guided by the inclined surfaces of the insertion slit 51 and ribs 52, 53 so that the surface of the memory element 42 is not contacted directly by the upper and lower cases 2, 3. The front end of the memory element 42 is held in a predetermined, inclined state by the stopper groove 55. In this state, the memory element 42 is held so as not to fall off by the urging force produced by the elastic deformation of the elastic portions 42d, 42d during insertion. After insertion of the memory element 42, the insertion slit 51 is covered with the frame portion 42c of the memory element 42 so that the entry of dust into the cartridge case 4 can be prevented.

Figure 17:
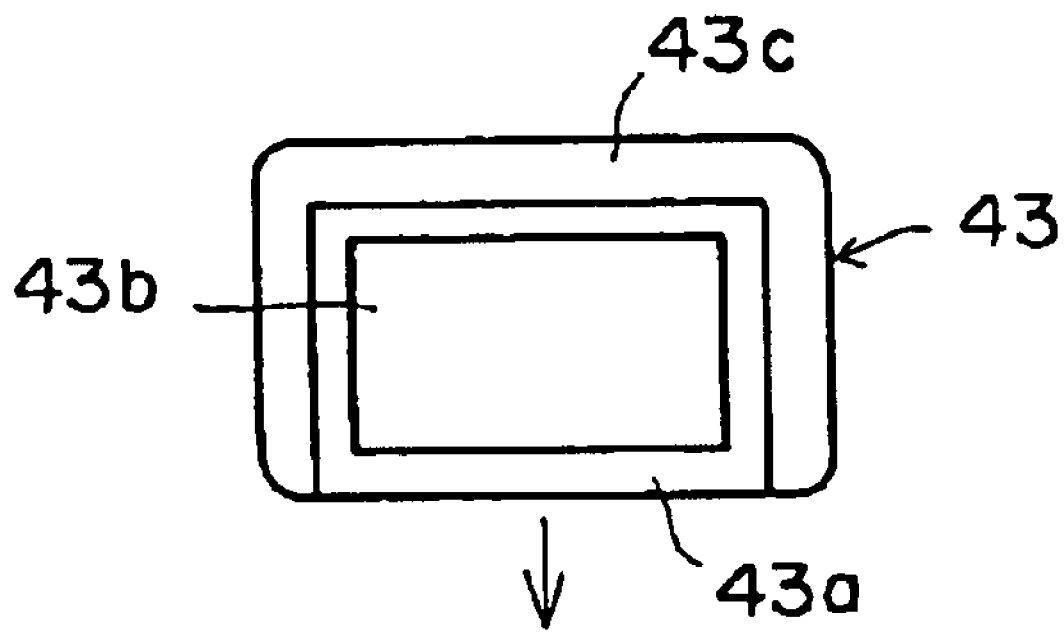
FIG. 17 is a plan view showing another embodiment of the memory element.

A memory element 43 with no elastic portion, such as the one shown in FIG. 17, can be likewise inserted through the insertion slit 51 and held in the element mounting portion 50. In this case the memory element 43 includes a thin board 43a, an element portion 43b mounted on the board 43a, and a frame portion 43c. The frame portion 43c is formed thick and the inside dimension between the opposite supporting walls 54, 54 in the element mounting portion 50 is slightly narrower than the width of the memory element 43. If the memory element 43 is press-fitted through the insertion slit 51, the memory element 43 can be held so as not to fall off.

Figure 18:
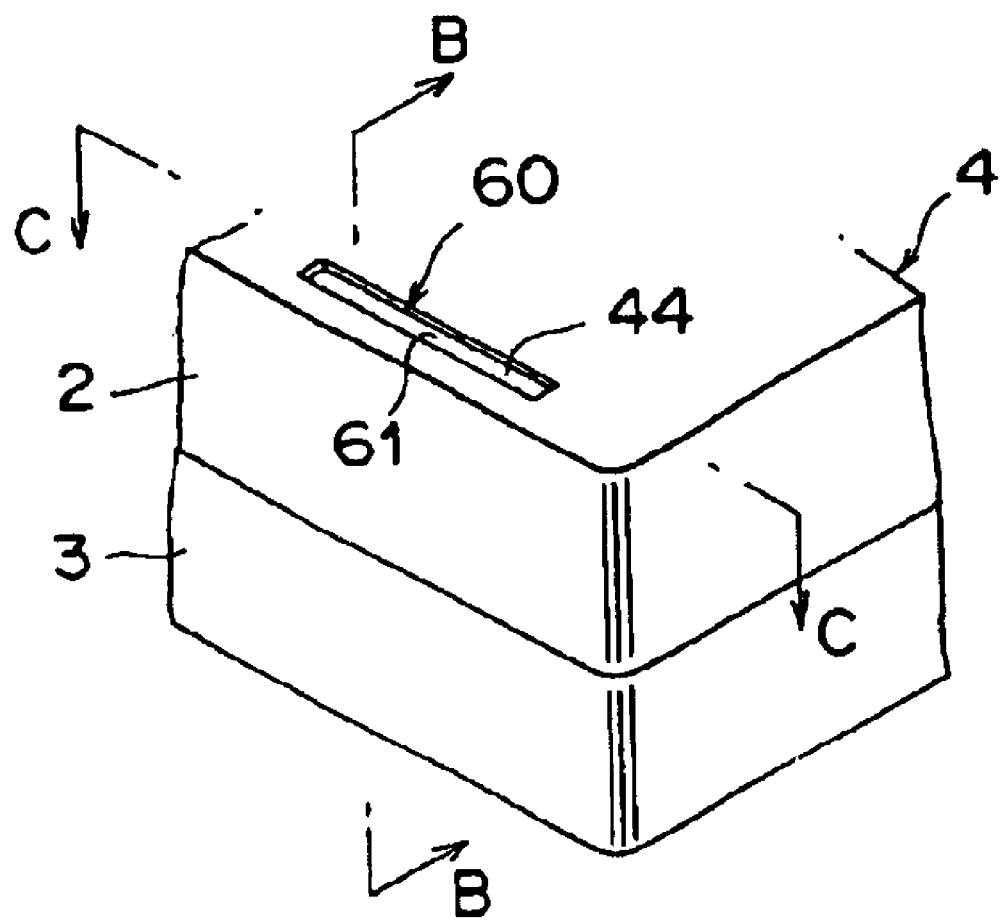
FIG. 18 is a perspective view showing another embodiment of the memory-element mounting portion of the magnetic tape cartridge of the present invention.
Figure 19:
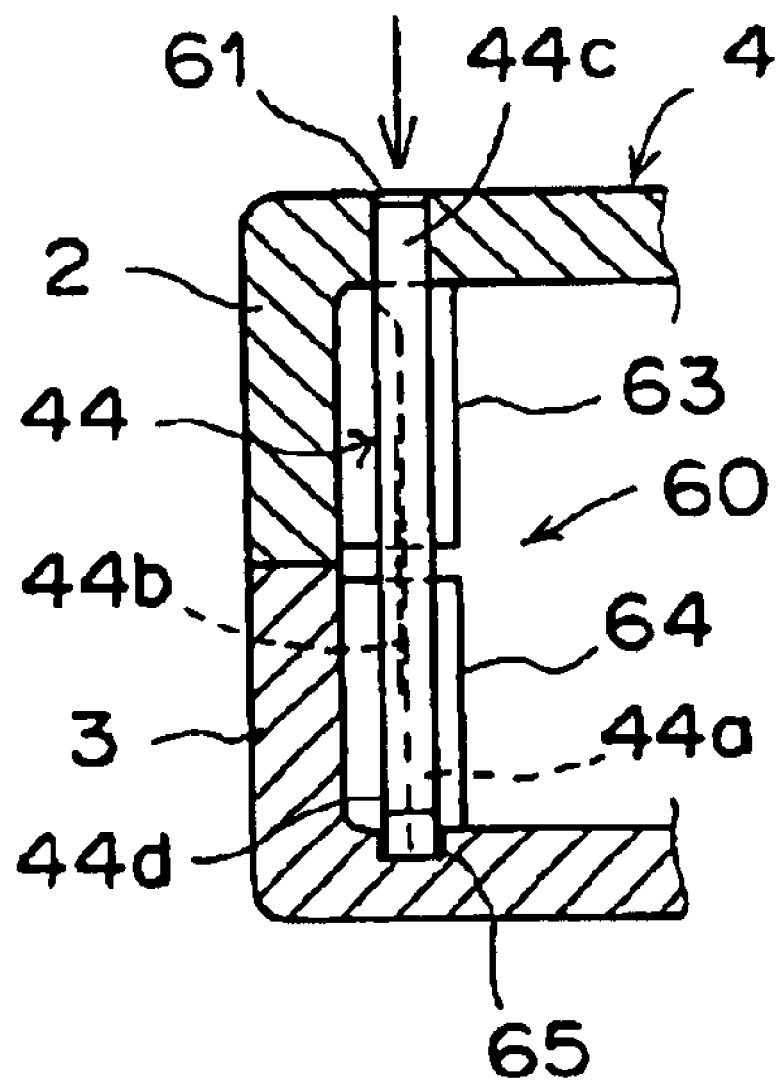
FIG. 19 is a sectional view taken substantially along line B—B of FIG. 18.
Figure 20:
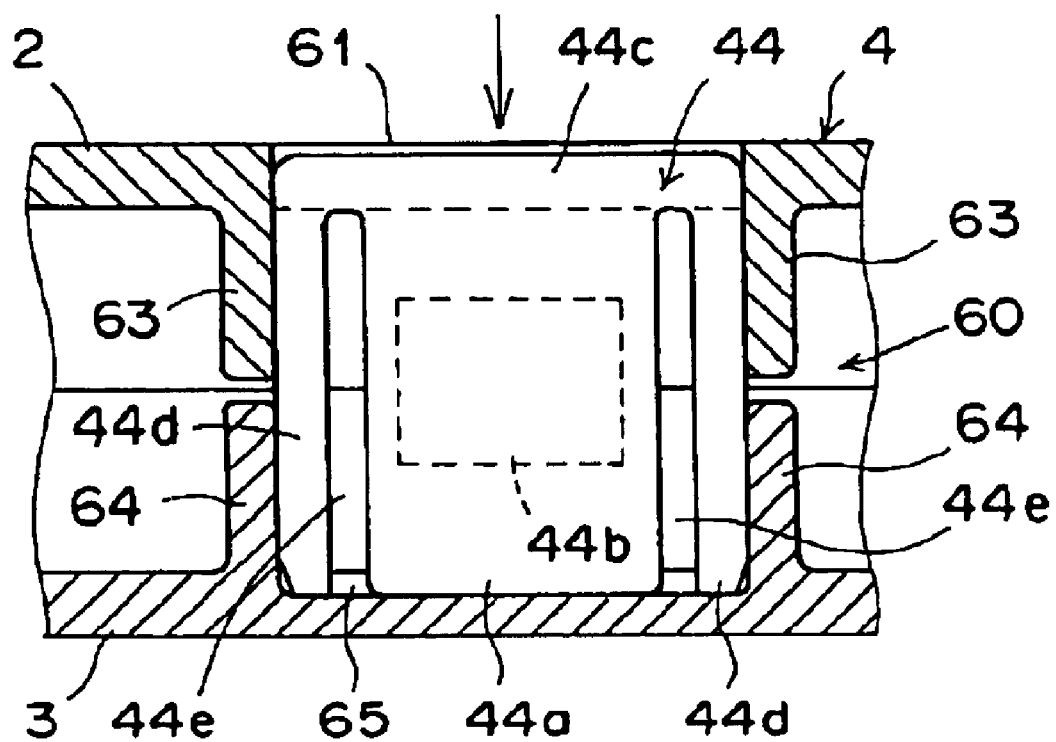
FIG. 20 is a sectional view taken substantially along line C—C of FIG. 18.

FIG. 18 illustrates a second embodiment of the magnetic tape cartridge of the present invention differing in how to mount a memory element. An insertion slit 61 in the element mounting portion 60 of the cartridge case 4 is formed in the top surface (or bottom surface) of the cartridge case 4, and a memory element 44 is inserted and held vertically so that it forms an angle of approximately 90 degrees with the bottom surface of the cartridge case 4.

The insertion slit 61 is formed in the top surface of the upper case 2, extends parallel to the side wall of the upper case 2, and is open downward. On both sides of the insertion slit 61, upper and lower supporting walls 63, 64 extending vertically are formed so that they can abut the opposite side portions of the memory element 44. The inside dimension between the opposite supporting walls 63 corresponds to the width of the memory element 44. The bottom wall of the lower case 3 in the element mounting portion 60 has a stopper groove 65 in which the lower end of the memory element 44 is held.

The memory element 44 includes an element portion 44b mounted on one surface of a rectangular board 44a. The frame portion 44c of the upper end portion of the board 44a is made thicker than the element portion 44b. Elastic portions 44d, 44d extend downward from the opposite ends of the frame portion 44c and have the same thickness as the frame portion 44c. A groove 44e is formed between the board 44a and the elastic portion 44d so that the lower end portion of the elastic portion 44d is elastically deformable inside. The lower end of each elastic portion 44d is cut obliquely. The insertion length of the memory element 44 is formed to a length equivalent to the height of the cartridge case 4.

After the upper case 2 and the lower case 3 are fastened together by the four small screws 30, and the cartridge case 4 is assembled, the memory element 42 is inserted vertical to the element mounting portion 60 through the insertion slit 61, while the elastic portions 44d, 44d are being slid along the interior surfaces of the supporting walls 63, 64 and being elastically deformed. The lower end of the memory element 44 is held in a predetermined vertical state by the stopper groove 65. In this state, the memory element 44 is held so as not to fall off by the urging force produced by the elastic deformation of the elastic portions 44d, 44d during insertion. After insertion of the memory element 44, the insertion slit 61 is covered with the frame portion 44c of the memory element 44 and therefore the entry of dust into the cartridge case 4 can be prevented.

In the case of the aforementioned memory element 43 with no elastic portion (where the insertion length is equivalent to the height of the cartridge case 4), the inside dimension between the opposite supporting walls 63 and 64 in the element mounting portion 60 is made slightly narrower than the width of the memory element 43. If the memory element 43 is press-fitted through the insertion slit 61, as with the aforementioned case, the memory element 43 can be held so as not to fall off.

According to the construction mentioned above, the memory elements 42 to 44 are inserted through the insertion slits 51, 56 after assembly of the cartridge case 4. Therefore, mounting of the memory elements 42 to 44 can be easily performed. In addition, since the memory elements 42 to 44 are not set in an unstable state with respect to the lower case 3 when assembling the cartridge case 4, assembly of the upper case 2 is easily and reliably performed and therefore assembly of the cartridge case 4 can be efficiently performed.

While certain representative embodiments and details have been shown for the purpose of illustrating the present invention, it will be apparent to those skilled in this art that various changes and modifications may be made without departing from the scope of the invention hereinafter claimed.

What is claimed is:

1. A magnetic tape cartridge comprising:
    a cartridge case, formed by fastening upper and lower cases integrally, and having a tape leader opening in side walls of said upper and lower cases;
    a single reel having magnetic tape wound thereon, and rotatably housed within said cartridge case; and
    a flat non-contact type memory element, where data is stored, housed within said cartridge case;
    wherein said memory element includes a front portion and a rear portion, said front portion having a thickness smaller than a thickness of said rear portion,
    wherein said cartridge case is provided with an element mounting portion having an insertion slit open to a case surface, and after assembly of said cartridge case, said memory element is inserted through said insertion slit and held in said element mounting portion,
    wherein said front portion is inserted into said insertion slit of said element mounting portion before said rear portion, and
    wherein the dimensions of said rear portion substantially conform to the dimensions of said insertion slit.

2. The magnetic tape cartridge as set forth in claim 1, wherein said insertion slit is formed in a side surface of said cartridge case and said memory element is inserted and held in said element mounting portion so that said memory element forms an angle of approximately 45 degrees with a bottom surface of said cartridge case.

3. The magnetic tape cartridge as set forth in claim 1, wherein said insertion slit is formed in a top surface or bottom surface of said cartridge case and said memory element is inserted and held in said element mounting portion so that said memory element forms an angle of approximately 90 degrees with a bottom surface of said cartridge case.

4. The magnetic tape cartridge as set forth in claim 1, wherein said memory element is press-fitted in said element mounting portion through said insertion slit.

5. The magnetic tape cartridge as set forth in claim 1, wherein when first data is recorded on said magnetic tape, second data, which is related to said first data, is stored in said memory element.

6. The magnetic tape cartridge as set forth in claim 5, wherein said second data is recorded on said memory element by a non-contact method.

7. The magnetic tape cartridge as set forth in claim 6, wherein said non-contact method is electro-magnetic induction.

8. The magnetic tape cartridge as set forth in claim 1, wherein said element mounting portion includes at least one inclined surface for guiding the insertion of said memory element into said element mounting portion.

9. The magnetic tape cartridge as set forth in claim 1, wherein said cartridge case includes a groove for holding said memory element in place upon insertion.

10. A magnetic tape cartridge comprising:
    a cartridge case, formed by fastening upper and lower cases integrally, and having a tape leader opening in side walls of said upper and lower cases;
    a single reel having magnetic tape wound thereon, and rotatably housed within said cartridge case; and
    a flat non-contact memory element, where data is stored, housed within said cartridge case;
    wherein said cartridge case is provided with an element mounting portion having an insertion slit open to a case surface, and after assembly of said cartridge case, said memory element is inserted through said insertion slit and held in said element mounting portion, and
    wherein said memory element has elastic portions at its side portions and said memory element is held in said element mounting portion by elastic deformation of said elastic portions produced when said memory element is inserted through said insertion slit.

11. The magnetic tape cartridge as set forth in claim 10, wherein each of said elastic portions has a tip end, which are ends of said elastic portions that first enter said insertion slit during insertion of said memory element, and
    wherein each tip end is shaped obliquely from at least one internal wall of said element mounting portion.

12. The magnetic tape cartridge as set forth in claim 10, wherein said insertion slit is formed in a side surface of said cartridge case and said memory element is inserted and held in said element mounting portion so that said memory element forms an angle of approximately 45 degrees with a bottom surface of said cartridge case.

13. The magnetic tape cartridge as set forth in claim 10, wherein said insertion slit is formed in a top surface or bottom surface of said cartridge case and said memory element is inserted and held in said element mounting portion so that said memory element forms an angle of approximately 90 degrees with a bottom surface of said cartridge case.

14. The magnetic tape cartridge as set forth in claim 10, wherein when first data is recorded on said magnetic tape, second data, which is related to said first data, is stored in said memory element.

15. The magnetic tape cartridge as set forth in claim 14, wherein the said second data is recorded on said memory element by a non-contact method.

16. The magnetic tape cartridge as set forth in claim 15, wherein said non-contact method is electro-magnetic induction.

17. The magnetic tape cartridge as set forth in claim 10, wherein said element mounting portion includes at least one inclined surface for guiding the insertion of said memory element into said element mounting portion.

18. The magnetic tape cartridge as set forth in claim 10, wherein said cartridge case includes a groove for holding said memory element in place upon insertion.

19. A magnetic tape cartridge comprising:
    a cartridge case, formed by fastening upper and lower cases integrally, and having a tape leader opening in side walls of said upper and lower cases;
    a single reel having magnetic tape wound thereon, and rotatably housed within said cartridge case; and
    a flat non-contact memory element, where data is stored, housed within said cartridge case;
    wherein said cartridge case is provided with an element mounting portion having an insertion slit open to a case surface, and after assembly of said cartridge case, said memory element is inserted through said insertion slit and held in said element mounting portion, and
    wherein once inserted, said memory element substantially seals said insertion slit.

* * * * *